United States Patent
Park et al.

(10) Patent No.: US 12,505,049 B2
(45) Date of Patent: Dec. 23, 2025

(54) HIERARCHICAL MEMORY SYSTEM

(71) Applicant: Samsung Electronics Co., Ltd., Suwon-si (KR)

(72) Inventors: Heekwon Park, San Jose, CA (US); Changho Choi, San Jose, CA (US); Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 218 days.

(21) Appl. No.: 18/334,981

(22) Filed: Jun. 14, 2023

(65) Prior Publication Data
US 2024/0338324 A1 Oct. 10, 2024

Related U.S. Application Data

(60) Provisional application No. 63/457,350, filed on Apr. 5, 2023.

(51) Int. Cl.
*G06F 12/12* (2016.01)
*G06F 12/123* (2016.01)

(52) U.S. Cl.
CPC .................................. *G06F 12/123* (2013.01)

(58) Field of Classification Search
CPC ............... G06F 12/123; G06F 12/0804; G06F 12/0811; G06F 12/0868; G06F 12/1009; G06F 2212/1024; G06F 2212/1016; G06F 3/0604; G06F 3/0647
See application file for complete search history.

(56) References Cited

U.S. PATENT DOCUMENTS

| | | | |
|---|---|---|---|
| 7,386,673 B2 | 6/2008 | van Riel | |
| 8,176,233 B1 * | 5/2012 | Karamcheti | G06F 12/109 |
| | | | 711/170 |
| 8,321,646 B2 | 11/2012 | Davies | |
| 8,775,731 B2 | 7/2014 | McHale et al. | |
| 9,478,274 B1 | 10/2016 | Michaud et al. | |
| 9,652,405 B1 | 5/2017 | Shain et al. | |
| 10,235,290 B2 | 3/2019 | Blagodurov et al. | |
| 10,360,144 B2 | 7/2019 | Oshimi et al. | |
| 10,740,016 B2 | 8/2020 | White et al. | |
| 11,093,410 B2 | 8/2021 | Gao et al. | |
| 2014/0195750 A1 | 7/2014 | Zhang et al. | |
| 2015/0106578 A1 | 4/2015 | Warfield et al. | |

(Continued)

OTHER PUBLICATIONS

Agarwal, N. et al., "Thermostat: Application-transparent Page Management for Two- tiered Main Memory", Proceedings of the Twenty-Second International Conference on Architectural Support for Programming Languages and Operating Systems, Apr. 8-12, 2017, pp. 631-644, ACM.

(Continued)

*Primary Examiner* — Hiep T Nguyen
(74) *Attorney, Agent, or Firm* — Womble Bond Dickinson (US) LLP

(57) ABSTRACT

A hierarchical memory system and method. In some embodiments, the method includes: demoting a first page of data from a fast memory to a slow memory; promoting the first page of data from the slow memory to an intermediate memory zone; and promoting the first page of data from the intermediate memory zone to the fast memory, wherein the intermediate memory zone includes a virtual zone within the slow memory.

20 Claims, 4 Drawing Sheets

(56) References Cited

U.S. PATENT DOCUMENTS

| | | |
|---|---|---|
| 2015/0106582 A1 | 4/2015 | Mai et al. |
| 2017/0228155 A1 | 8/2017 | Shirota et al. |
| 2018/0247164 A1 | 8/2018 | Yao et al. |
| 2019/0243771 A1 | 8/2019 | Mittal et al. |
| 2020/0125290 A1* | 4/2020 | Shah .................... G06F 3/0634 |

OTHER PUBLICATIONS

Luo, Y. et al., "WARM: Improving NAND Flash Memory Lifetime with Write-hotness Aware Retention Management", 31st Symposium on Mass Storage Systems and Technologies, 2015, pp. 1-14, IEEE.

Prodromou, A. et al., "MemPod: A Clustered Architecture for Efficient and Scalable Migration in Flat Address Space Multi-level Memories", 2017 IEEE International Symposium on High Performance Computer Architecture, IEEE Computer Society, May 8, 2017, pp. 433-444, IEEE.

EPO Extended European Search Report dated Sep. 4, 2024, issued in corresponding European Patent Application No. 24161749.7 (6 pages).

* cited by examiner

HIERARCHICAL MEMORY SYSTEM

CROSS-REFERENCE TO RELATED APPLICATION(S)

The present application claims priority to and the benefit of U.S. Provisional Application No. 63/457,350, filed Apr. 5, 2023, entitled "SYSTEM AND METHOD FOR MITIGATING SWITCHING BETWEEN FAST AND SLOW MEMORY CAUSED BY WARM MEMORY PAGES IN MULTI-LEVEL MEMORY SYSTEMS", the entire content of which is incorporated herein by reference.

FIELD

One or more aspects of embodiments according to the present disclosure relate to computing systems, and more particularly to a memory system for a computing system.

BACKGROUND

In a computing system, memory may be employed to store instructions and data. Newly developed applications may have greater demands for memory.

It is with respect to this general technical environment that aspects of the present disclosure are related.

SUMMARY

According to an embodiment of the present disclosure, there is provided a method, including: demoting a first page of data from a fast memory to a slow memory; promoting the first page of data from the slow memory to an intermediate memory zone; and promoting the first page of data from the intermediate memory zone to the fast memory, wherein the intermediate memory zone includes a virtual zone within the slow memory.

In some embodiments: the demoting of the first page of data from the fast memory to the slow memory includes a first demotion of the first page of data; and the method further includes: performing a second demotion of the first page of data, the second demotion of the first page of data including demoting the first page of data from the fast memory to the slow memory; and increasing a size of the intermediate memory zone, based on the first demotion and the second demotion.

In some embodiments, the method further includes: determining that a page utilization metric in the intermediate memory zone is less than a threshold; and decreasing a size of the intermediate memory zone.

In some embodiments, the method further includes: determining that a page utilization metric in the intermediate memory zone is less than a threshold; and decreasing a size of the intermediate memory zone, wherein the decreasing of the size of the intermediate memory zone includes promoting a second page of data from the intermediate memory zone to the fast memory.

In some embodiments, the slow memory is managed by a system memory manager.

In some embodiments: the slow memory includes persistent memory; and the slow memory is managed by a file system.

In some embodiments, the method further includes: determining a first access count, for a second page of data, in the intermediate memory zone; and determining a second access count, for the second page of data, in the intermediate memory zone.

In some embodiments, the method further includes: determining a third access count, for a third page of data, in the intermediate memory zone; determining that the third access count is greater than the second access count; and based on determining that the third access count is greater than the second access count, promoting the third page of data from the intermediate memory zone to the fast memory.

In some embodiments, the method further includes: determining a third access count, for a third page of data, in the intermediate memory zone; determining a fourth access count, for a third page of data, in the intermediate memory zone; determining that a sum of the third access count and the fourth access count is greater than a sum of the first access count and the second access count; and based on determining that a sum of the third access count and the fourth access count is greater than a sum of the first access count and the second access count, promoting the third page of data from the intermediate memory zone to the fast memory.

In some embodiments, the method further includes: determining a third access count, for a third page of data, in the intermediate memory zone; determining a fourth access count, for a third page of data, in the intermediate memory zone; determining that a number of nonzero values among the third access count and the fourth access count is greater than a number of nonzero values among the first access count and the second access count; and based on determining that a number of nonzero values among the third access count and the fourth access count is greater than a number of nonzero values among the first access count and the second access count, promoting the third page of data from the intermediate memory zone to the fast memory.

In some embodiments: the slow memory includes persistent memory; the slow memory is managed by a file system; and the method further includes storing the first access count, and the second access count in a file node corresponding to the second page of data.

According to an embodiment of the present disclosure, there is provided a system, including: a processing circuit; and memory, operatively connected to the processing circuit and storing instructions that, when executed by the processing circuit, cause the system to perform a method, the method including: demoting a first page of data from a fast memory to a slow memory; promoting the first page of data from the slow memory to an intermediate memory zone; and promoting the first page of data from the intermediate memory zone to the fast memory, wherein the intermediate memory zone is a virtual zone within the slow memory.

In some embodiments: the demoting of the first page of data from the fast memory to the slow memory is a first demotion of the first page of data; and the method further includes: performing a second demotion of the first page of data, the second demotion of the first page of data including demoting the first page of data from the fast memory to the slow memory; and increasing a size of the intermediate memory zone, based on the first demotion and the second demotion.

In some embodiments, the method further includes: determining that a page utilization metric in the intermediate memory zone is less than a threshold; and decreasing a size of the intermediate memory zone.

In some embodiments, the method further includes: determining that a page utilization metric in the intermediate memory zone is less than a threshold; and decreasing a size of the intermediate memory zone, wherein the decreasing of the size of the intermediate memory zone includes promoting a second page of data from the intermediate memory zone to the fast memory.

In some embodiments, the slow memory is managed by a system memory manager.

In some embodiments: the slow memory includes persistent memory; and the slow memory is managed by a file system.

According to an embodiment of the present disclosure, there is provided a device, including: a processing circuit; a fast memory; and a slow memory, the device being configured to: demote a first page of data from the fast memory to the slow memory; promoting the first page of data from the slow memory to an intermediate memory zone; and promote the first page of data from the intermediate memory zone to the fast memory, wherein the intermediate memory zone is a virtual zone within the slow memory.

In some embodiments, the slow memory is managed by a system memory manager.

In some embodiments: the slow memory includes persistent memory; and the slow memory is managed by a file system.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
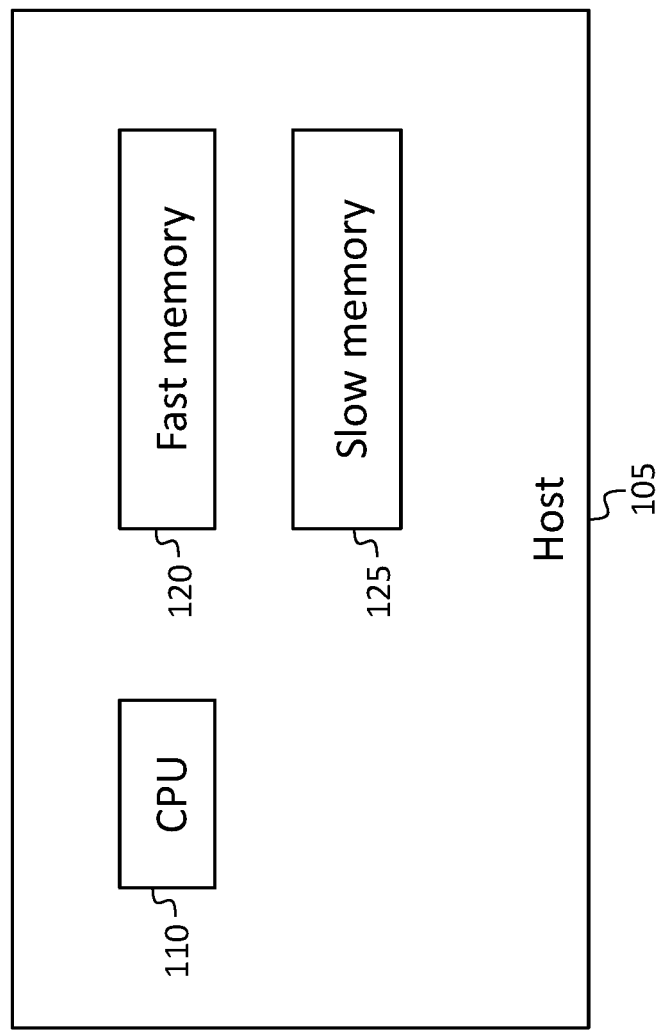
FIG. 1 is a block diagram of a computing system, according to an embodiment of the present disclosure.

The detailed description set forth below in connection with the appended drawings is intended as a description of exemplary embodiments of a memory system provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a computer system with different types of memory (which may be organized as different tiers of a hierarchy), frequently accessed data may be stored in a higher level of the hierarchy (for example, in a level including memory having relatively low latency or relatively high bandwidth), and infrequently accessed data may be stored in a lower level of the hierarchy (for example, in a level including memory having higher latency or lower bandwidth). For example, in a computer system with two tiers of memory, which may be referred to as fast memory and slow memory, frequently accessed data may be stored in the fast memory and infrequently accessed data may be stored in the slow memory.

As access patterns of the data change, it may be that data that was at one time infrequently accessed becomes frequently accessed, or vice versa. In such a situation the data may be promoted to the fast memory or demoted to the slow memory, as appropriate. If the system uses a measure of access frequency (for example, the number of accesses during a time interval having a specified length) and a corresponding access frequency threshold, then data having an access frequency just below the threshold may be promoted as a result of a small increase in access frequency, and data having an access frequency just above the threshold may be demoted as a result of a small decrease in access frequency.

In this situation it is possible for a unit of data (for example, a page of data) to be repeatedly promoted and then demoted, as a result of small variations in the access frequency of the unit of data. This repeated promoting and demoting of the data may be computationally intensive, and may require repeated migrating of the data back and forth between the fast memory and the slow memory. As such, in some embodiments, an intermediate memory zone is implemented, to reduce such repeated promoting and demoting of data. The intermediate memory zone may be implemented in the slow memory, and, as such, it may include a virtual memory zone; whether a page of memory is in the intermediate memory zone may be determined by metadata (for example, a flag) associated with the page of data. As such, moving the data from the intermediate memory zone to the slow memory may involve only changing the value of the metadata (and may not require copying of the data to different memory cells), and, similarly, moving the data from the slow memory to the intermediate memory zone may involve only changing the value of the metadata.

In such an embodiment, data may be demoted from the fast memory to the slow memory when the memory utilization of the fast memory exceeds a utilization threshold; when this occurs, the pages to be demoted may be selected based on, for example, a least recently used (LRU) algorithm, in which pages for which the time of the most recent access is farthest in the past are demoted first. Data may be promoted from the slow memory to the intermediate memory zone when it is accessed. Data may be demoted from the intermediate memory zone to the slow memory when a certain amount of time has elapsed without the data being accessed.

The intermediate memory zone may, at any time, have a set size, and data may be promoted from the intermediate memory zone to the fast memory when the intermediate memory zone overflows, for example, (i) when the intermediate memory zone is full (the amount of data in the intermediate memory zone is equal to the size of the intermediate memory zone) and additional data is promoted into the intermediate memory zone, or (ii) when the intermediate memory zone is full (the amount of data in the intermediate memory zone is equal to the size of the intermediate memory zone) and the size of the intermediate memory zone is reduced. The size of the intermediate memory zone may be adjusted so that repeated promoting and demoting of the data is reduced or avoided (for example, when repeated promoting and demoting of the data occurs, the size of the intermediate memory zone may be increased) and so that promotions from the intermediate memory zone to the fast memory occur at an acceptable rate (for example, if promotions from the intermediate memory zone to the fast memory are too rare, the size of the intermediate memory zone may be decreased).

In such an embodiment, repeated promoting and demoting of the data may be reduced or avoided. Data that would, in a simple two-tier system, be near the promotion and demotion threshold (and possibly subject to repeated promoting and demoting of the data) may instead be stored in the intermediate memory zone, and subject to different promotion and demotion rules as a result.

FIG. 1 is a system-level block diagram of a computing system, in some embodiments. A host 105 includes a central processing unit 110, a fast memory 120, which may be system memory (for example, dynamic random-access memory (DRAM)), and a slow memory 125, which may be a persistent memory. The slow memory may include one or more nonvolatile dual in line memory modules (NVDIMMs) or it may be a persistent memory device capable of supporting both a storage protocol (such as nonvolatile memory express (NVMe) or a Compute Express Link storage protocol (CXL.io)) and a memory protocol (for example, CXL.mem). In operation, the central processing unit 110 of the host 105 may fetch data and instructions from the fast memory 120 or from the slow memory 125. The central processing unit 110 of the host 105 may then process the data according to the instructions, and store the results in the fast memory 120 or in the slow memory 125.

Each physical memory layer in a multi-level memory system may have different access latency. The system software may endeavor to keep pages of data having a high access frequency (or "hot" pages) in fast memory 120 and keep pages of data having a low access frequency (or "cold" pages) in slow memory 125. The system software may use a cache replacement algorithm such as least recently used (LRU) to assess access frequency (or "hotness"). Therefore, pages having an intermediate access frequency (or "warm" pages) may "ping-pong" between the fast memory 120 and the slow memory 125, for example, they may be repeatedly promoted and demoted between the fast memory 120 and the slow memory 125, and such pages having an intermediate access frequency may consequently be frequently migrated between fast and slow memory, resulting in a significant burden (in the form of overhead) to the computing system. In some circumstances, the migration overhead may be greater than the overhead of accessing slow memory.

Figure 2:
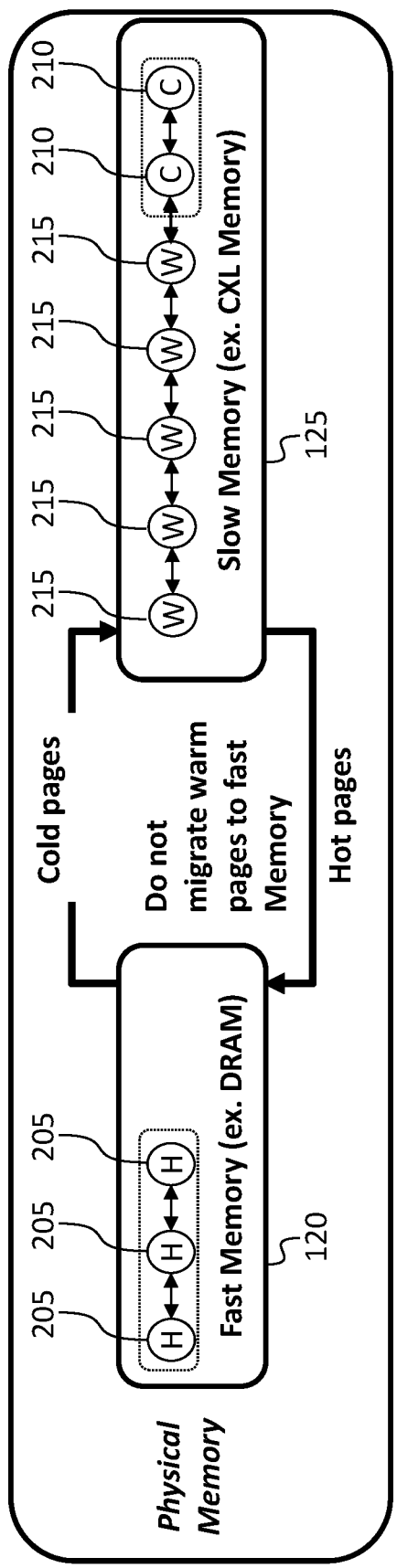
FIG. 2 is a schematic block diagram of a two-tier memory system, according to an embodiment of the present disclosure.

FIG. 2 shows a schematic block diagram of a two-tier memory system, in some embodiments. Pages 205 having a high access frequency may be migrated to (for example, stored in) the fast memory 120, and pages 210 having a low access frequency may be migrated to (for example, stored in) the slow memory 125. Pages 215 having an intermediate access frequency may be migrated to (for example, stored in) the slow memory 125 which may have greater capacity than the fast memory 120.

Figure 3:
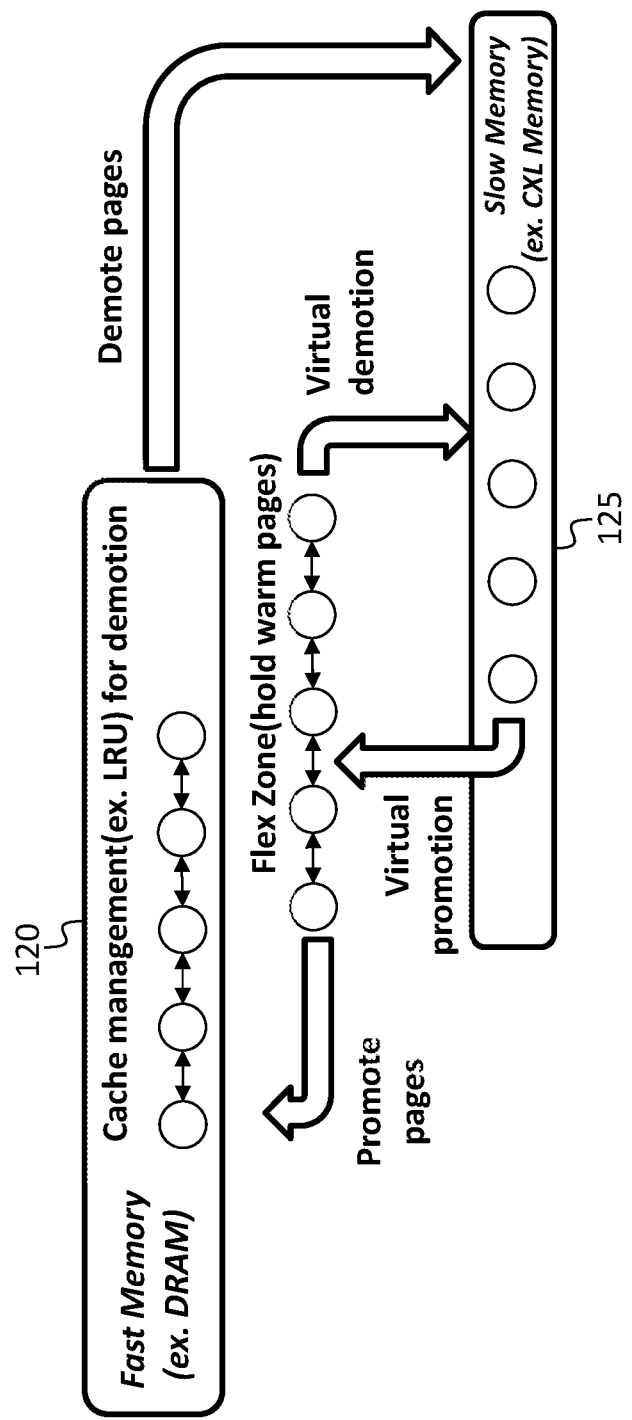
FIG. 3 is a block diagram of a tiered memory system including a virtual intermediate memory zone, according to an embodiment of the present disclosure.

FIG. 3 shows a tiered memory system including a virtual intermediate memory zone, in some embodiments. As used herein, a "zone" within a memory is a portion of the memory. The memory, and the zone, may be heterogeneous, e.g., it may include memory cells constructed using different memory technologies. As used herein, a "virtual zone" in a memory is a subset of memory locations in a memory that are designated or otherwise identified as being distinct, in function, from the remaining memory locations in the memory, without being physically distinct from the remaining memory locations in the memory. For example, if the fast memory 120 consists of a block of dynamic random-access memory (DRAM) and the system also includes a block of (slower) persistent memory, then a subset of the memory locations of the persistent memory may be identified (for example, flagged) as being part of the intermediate memory zone, and the remainder of the persistent memory may form the slow memory. Data stored in a certain page of the intermediate memory zone may be "moved" (e.g., demoted) to the slow memory without copying it to a different page but instead by changing its designation (for example, changing the value of a flag that designates the page as being either in the slow memory 125 or in the intermediate memory zone). The memory system may virtually promote accessed pages, when such access causes their access frequency to exceed a threshold, to an intermediate memory zone (or "flex zone") that holds a limited number of pages. If the number of pages in the intermediate memory zone exceeds the intermediate memory zone size, some pages may be physically migrated to fast memory if there is free space in the fast memory. As used herein, both "promoting" data and "demoting" data mean moving the data from one memory to another memory, or from one memory zone to another memory zone. "Promoting" may refer to moving data from a memory to another memory with superior performance, but "promoting" is not limited to such a move (and in some cases, for example, moving of data to another memory that has superior performance in some respects (e.g., bandwidth) and inferior performance in other respects (e.g., latency) may be referred to as "promoting"). "Demoting" may, but need not, refer to moving data from a memory to another memory with inferior performance.

The threshold for the number of pages in the intermediate memory zone may be adjusted depending on whether repeated promoting and demoting of the data occurs and how stable the intermediate memory zone is. For example, if repeated promoting and demoting of the data occurs, the size of the intermediate memory zone may be increased, to make it possible to keep more pages in the intermediate memory zone. If the intermediate memory zone is stable (for example, promotions to the fast memory 120 and demotions to the slow memory 125 are rare), then the size of the intermediate memory zone size may be decreased, so as to promote some pages. Demotions to the slow memory 125 may be taken into account when determining whether to adjust the size of the intermediate memory zone because if pages are not being demoted to the slow memory 125, it may indicate that the pages in the intermediate memory zone are being accessed.

Some embodiments may have several advantages. For example, page migration overhead due to warm memory pages (which may cause overall system performance to deteriorate) may be mitigated, for example, reduced. Some embodiments may dynamically reflect page status or system status in page migration decisions. For example, an adaptive intermediate memory zone size may be implemented, and the number of pages classified as having an intermediate access frequency may change continuously. Page status changes may be reflected in the sense that pages may be virtually promoted and virtually demoted to or from the intermediate memory zone. Pages classified as having an intermediate access frequency may be reclassified. For example, a page classified as having an intermediate access frequency may subsequently be classified as having a high access frequency, then as having an intermediate access frequency, and then as having a low access frequency. System status changes may be reflected in the sense that when memory utilization is low, the size of the intermediate memory zone may be reduced to promote some pages, and when repeated promoting and demoting of the data occurs, page promotion from the intermediate memory zone to fast memory may be stopped (by increasing the size of the intermediate memory zone) even if the number of pages in the intermediate memory zone exceeds the intermediate memory zone threshold. This mechanism may be utilized for user data pages (for example, slow memory 125 may be used as memory) and for file data pages (for example, slow memory 125 may be used as storage).

As mentioned above, in some embodiments, the slow memory 125 may be used as storage. In such an embodiment, the slow memory 125 may be persistent memory, such as non-volatile memory, a solid-state drive (SSD) (for example, a CXL SSD) or Optane™ memory. In such an embodiment, the file system may manage the slow memory 125. The file system may allocate pages of files within the size constraints of the slow memory 125, for example, the size of the file system may be less than or equal to the size of the slow memory 125. To access file data, the file system may choose whether to use a cache (for example, the fast memory 120) or directly access file data pages (in the slow memory 125). In such an embodiment, demotion may not need to involve performing a data copy from fast memory 120 to slow memory 125, because the slow memory may already have the file data page; as such only the mapping and metadata may be updated.

In some embodiments, write intensive file pages may have lower priority for promotion from slow memory to fast memory than read intensive file pages. File pages may be written back to the slow memory; as such, it may be better to keep write intensive pages in slow memory 125.

In embodiments in which the slow memory 125 is used as storage, a file node for a file page in the file system may store access counts for multiple periods. For example, a 64 bit number may be used to store (i) a write identifier (write ID) in 10 bits, a page number in 42 bits or 35 bits, and a set of access counts (for example, 3-bit access counts for the four most recent periods) in 12 bits. A user-space process (for example, an application) may access the fast memory 120 and the slow memory 125 either (i) through a memory protocol accessing virtual memory for a memory mapped file (using load and store instructions executed by the central processing unit 110, after a call to a suitable operating system call such as mmap( ) in the Linux operating system, which creates a new mapping in the virtual address space of the calling process) or (ii) through the file system (which may also create a mapping to the virtual memory for the memory mapped file). Both the memory mapped file and the file system may interact with (for example, perform read operations and write operations on) both the fast memory 120 and the slow memory 125.

In some embodiments, a virtual memory scan daemon may periodically update the access counts. The virtual memory scan daemon may (i) periodically scan the virtual memory range, (ii) check the access bit and dirty bit for each page, (iii) if the file page has been accessed, increase the access count for the current period, and (iv) clear the access bit or dirty bit. The access count of the current period may be increased when (i) the user (for example, the application) makes a system call to the read ( ) or write ( ) function or (ii) the virtual memory scan daemon detects that the user accessed the page. The virtual memory scan daemon may detect that the user accessed the page when the page table entry (PTE) has an accessed bit and a dirty bit that are set by the central processing unit 110 when the user (for example, the application) accesses or writes the file page. The page table entry may be the last level table entry in the paging system for virtual-to-physical memory mapping.

The access count of a page with low access frequency (a "cold" page) may be initially set to "0" for all of the periods for which access counts are being tracked. If the user accesses such a page, the page may be virtually migrated from slow memory 125 to the intermediate memory zone. A promotion daemon may periodically check the pages in the intermediate memory zone. The access count of file nodes in the intermediate memory zone may be periodically shifted to the left by 3 bits (for example, every period, the bits may be shifted to the left by 3 bits, where 3 bits is the width of each access count, as mentioned above). If all access counts become 0, the file page is virtually demoted to the slow memory 125. If the number of pages in the intermediate memory zone exceeds the current size threshold for the intermediate memory zone, then some pages may be promoted to the fast memory 120.

The promotion priority of file pages (which may be used to select the pages to be promoted when the number of pages in the intermediate memory zone exceeds the current size threshold for the intermediate memory zone) may be set as follows. If the current access count of a page overflows, the page may be immediately promoted (because such an overflow is an indication of heavy access). Otherwise, each page may be prioritized using 12 bits (4 bits+5 bits+3 bits). Periodically accessed pages (4 bits) may be accorded the highest priority. A page may be deemed periodically accessed if the page has been accessed in each period (the current period and the three preceding periods). Alternatively, it may be determined that a first page is more nearly periodically accessed than a second page (and the first page may be given promotion priority over the second page) if the number of nonzero values among the access counts for the first page is greater than the number of nonzero values among the access counts for the second page.

Frequently accessed pages (5 bits) may be given intermediate priority. The 5-bit number specifying the access frequency may the sum of the four access counts. For example, it may be determined that a first page is more frequently accessed than a second page (and the first page may be given promotion priority over the second page) if the sum of the access counts for the first page is greater than the sum of the access counts for the second page. Recently accessed pages (3 bits) may be accorded the lowest priority. The 3 bits may be the access count of the current period. For example, it may be determined that a first page was more recently accessed than a second page (and the first page may be given promotion priority over the second page) if the access count of the current period for the first page is greater than the access count of the current period for the second page.

As mentioned above, in some embodiments, the slow memory 125 may be used as memory. In such an embodiment, the slow memory 125 need not be persistent memory. The slow memory 125 may be both volatile and non-volatile memory, and the system memory manager may manage the slow memory 125. The slow memory 125 may be dynamically allocated to the application for the application's data. The data may be copied to the destination memory node. If the slow memory 125 is full, some data pages may be swapped out to storage devices.

As in an embodiment in which the slow memory 125 is used as storage, a virtual memory scan daemon may periodically update the access counts of the pages. The virtual memory scan daemon may (i) periodically scan the virtual memory range, (ii) check the access bit and dirty bit of the data page, (iii) if the data page has been accessed, increase the access count for the current period, and (iv) clear the access bit or dirty bit.

The system may manage each data page using data page metadata. The access count of the current period may be increased when the virtual memory scan daemon detects that the user accessed the page. The virtual memory scan daemon may detect that the user accessed the page when the page table entry (PTE) has an accessed bit and a dirty bit that are set by the central processing unit 110 when the user (for example, the application) accesses or writes the file page. The page table entry may be the last level table entry in the paging system for virtual-to-physical memory mapping.

The access count of a page with low access frequency (a "cold" page) may be initially set to "0" for all of the periods for which access counts are being tracked. If the user accesses such a page, the page may be virtually migrated from slow memory 125 to the intermediate memory zone. A promotion daemon may periodically check the pages in the intermediate memory zone. The access count of data pages in the intermediate memory zone may be periodically shifted to the left by 2 bits (for example, every period, the bits may be shifted to the left by 2 bits; using fewer bits (than in an embodiment in which the slow memory 125 is used for storage) for the access count may cause the system to promote pages more actively). If all access counts become 0, the file page is virtually demoted to the slow memory 125. If the number of pages in the intermediate memory zone exceeds the current size threshold for the intermediate memory zone, then some pages may be promoted to the fast memory 120.

The promotion priority of file pages (which may be used to select the pages to be promoted when the number of pages in the intermediate memory zone exceeds the current size threshold for the intermediate memory zone) may be set as follows. If the current access count of a page overflows, the page may be immediately promoted (because such an overflow is an indication of heavy access). Otherwise, each page may be prioritized using 10 bits (4 bits+4 bits+2 bits). Periodically accessed pages (4 bits) may be accorded the highest priority. A page may be deemed periodically accessed if the page has been accessed in each period (the current period and the three preceding periods). Alternatively, it may be determined that a first page is more nearly periodically accessed than a second page (and the first page may be given promotion priority over the second page) if the number of nonzero values among the access counts for the first page is greater than the number of nonzero values among the access counts for the second page.

Frequently accessed pages (4 bits) may be given intermediate priority. The 4-bit number specifying the access frequency may the sum of the four access counts. For example, it may be determined that a first page is more frequently accessed than a second page (and the first page may be given promotion priority over the second page) if the sum of the access counts for the first page is greater than the sum of the access counts for the second page. Recently accessed pages (2 bits) may be accorded the lowest priority. The 2 bits may be the access count of the current period. For example, it may be determined that a first page was more recently accessed than a second page (and the first page may be given promotion priority over the second page) if the access count of the current period for the first page is greater than the access count of the current period for the second page.

Figure 4:
FIG. 4 is a flow chart of a method, according to an embodiment of the present disclosure.

FIG. 4 is a flowchart of a method, in some embodiments. The method includes demoting, at 405, a first page of data from a fast memory to a slow memory; promoting, at 410, the first page of data from the slow memory to an intermediate memory zone; and promoting, at 415, the first page of data from the intermediate memory zone to the fast memory. The intermediate memory zone may be a virtual zone within the slow memory. The method further includes performing, at 420, a second demotion of the first page of data, the second demotion of the first page of data comprising demoting the first page of data from the fast memory to the slow memory; in response to the first demotion and the second demotion, increasing, at 425, the size of the intermediate memory zone, determining, at 430, that a page utilization metric in the intermediate memory zone is less than a threshold; and decreasing, at 435, the size of the intermediate memory zone. The method further includes determining, at 440, a first access count, for a second page of data, in the intermediate memory zone, in a first period; determining, at 445, a second access count, for a second page of data, in the intermediate memory zone, in a second period; determining, at 450, a third access count, for a third page of data, in the intermediate memory zone, in a first period; and determining, at 455, a fourth access count, for a third page of data, in the intermediate memory zone, in a second period.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1-Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (for example, in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (for example, an adjustment) or a first quantity (for example, a first variable) is referred to as being "based on" a second quantity (for example, a second variable) it means that the second quantity is an input to the method or influences the first quantity, for example, the second quantity may be an input (for example, the only input, or one of several inputs) to a function that calculates the first quantity, or the first quantity may be equal to the second quantity, or the first quantity may be the same as (for example, stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., $(1-35/100)$ times 10) and the recited maximum value of 13.5 (i.e., $(1+35/100)$ times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Some embodiments may include features of the following numbered statements.

1. A method, comprising:
   demoting a first page of data from a fast memory to a slow memory;
   promoting the first page of data from the slow memory to an intermediate memory zone; and
   promoting the first page of data from the intermediate memory zone to the fast memory,
   wherein the intermediate memory zone is a virtual zone within the slow memory.

2. The method of statement 1, wherein:
   the demoting of the first page of data from the fast memory to the slow memory is a first demotion of the first page of data; and
   the method further comprises:
     performing a second demotion of the first page of data, the second demotion of the first page of data comprising demoting the first page of data from the fast memory to the slow memory; and
     increasing a size of the intermediate memory zone, based on the first demotion and the second demotion.

3. The method of statement 1 or statement 2, further comprising:
   determining that a page utilization metric in the intermediate memory zone is less than a threshold; and
   decreasing a size of the intermediate memory zone.

4. The method of any one of the preceding statements, further comprising:
   determining that a page utilization metric in the intermediate memory zone is less than a threshold; and
   decreasing a size of the intermediate memory zone,
   wherein the decreasing of the size of the intermediate memory zone comprises promoting a second page of data from the intermediate memory zone to the fast memory.

5. The method of any one of the preceding statements, wherein the slow memory is managed by a system memory manager.

6. The method of any one of the preceding statements, wherein:
   the slow memory comprises persistent memory; and
   the slow memory is managed by a file system.

7. The method of statement 1, further comprising:
   determining a first access count, for a second page of data, in the intermediate memory zone; and
   determining a second access count, for the second page of data, in the intermediate memory zone.

8. The method of statement 7, further comprising:
   determining a third access count, for a third page of data, in the intermediate memory zone;
   determining that the third access count is greater than the second access count; and
   based on determining that the third access count is greater than the second access count, promoting the third page of data from the intermediate memory zone to the fast memory.

9. The method of statement 7, further comprising:
   determining a third access count, for a third page of data, in the intermediate memory zone;

determining a fourth access count, for a third page of data, in the intermediate memory zone;
determining that a sum of the third access count and the fourth access count is greater than a sum of the first access count and the second access count; and
based on determining that a sum of the third access count and the fourth access count is greater than a sum of the first access count and the second access count, promoting the third page of data from the intermediate memory zone to the fast memory.

10. The method of statement 7, further comprising:
determining a third access count, for a third page of data, in the intermediate memory zone;
determining a fourth access count, for a third page of data, in the intermediate memory zone;
determining that a number of nonzero values among the third access count and the fourth access count is greater than a number of nonzero values among the first access count and the second access count; and
based on determining that a number of nonzero values among the third access count and the fourth access count is greater than a number of nonzero values among the first access count and the second access count, promoting the third page of data from the intermediate memory zone to the fast memory.

11. The method of statement 7, wherein:
the slow memory comprises persistent memory;
the slow memory is managed by a file system; and
the method further comprises storing the first access count, and the second access count in a file node corresponding to the second page of data.

12. A system, comprising:
a processing circuit; and
memory, operatively connected to the processing circuit and storing instructions that, when executed by the processing circuit, cause the system to perform a method, the method comprising:
demoting a first page of data from a fast memory to a slow memory;
promoting the first page of data from the slow memory to an intermediate memory zone; and
promoting the first page of data from the intermediate memory zone to the fast memory,
wherein the intermediate memory zone is a virtual zone within the slow memory.

13. The system of statement 12, wherein:
the demoting of the first page of data from the fast memory to the slow memory is a first demotion of the first page of data; and
the method further comprises:
performing a second demotion of the first page of data, the second demotion of the first page of data comprising demoting the first page of data from the fast memory to the slow memory; and
increasing a size of the intermediate memory zone, based on the first demotion and the second demotion.

14. The system of statement 12 or statement 13, wherein the method further comprises:
determining that a page utilization metric in the intermediate memory zone is less than a threshold; and
decreasing a size of the intermediate memory zone.

15. The system of any one of statements 12 to 14, wherein the method further comprises:
determining that a page utilization metric in the intermediate memory zone is less than a threshold; and
decreasing a size of the intermediate memory zone,
wherein the decreasing of the size of the intermediate memory zone comprises promoting a second page of data from the intermediate memory zone to the fast memory.

16. The system of any one of statements 12 to 15, wherein the slow memory is managed by a system memory manager.

17. The system of any one of statements 12 to 16, wherein:
the slow memory comprises persistent memory; and
the slow memory is managed by a file system.

18. A device, comprising:
a processing circuit;
a fast memory; and
a slow memory,
the device being configured to:
demote a first page of data from the fast memory to the slow memory;
promoting the first page of data from the slow memory to an intermediate memory zone; and
promote the first page of data from the intermediate memory zone to the fast memory,
wherein the intermediate memory zone is a virtual zone within the slow memory.

19. The device of statement 18, wherein the slow memory is managed by a system memory manager.

20. The device of statement 18 or statement 19, wherein:
the slow memory comprises persistent memory; and
the slow memory is managed by a file system.

Although exemplary embodiments of a memory system have been specifically described and illustrated herein, many modifications and variations will be apparent to those skilled in the art. Accordingly, it is to be understood that a memory system constructed according to principles of this disclosure may be embodied other than as specifically described herein. The invention is also defined in the following claims, and equivalents thereof.

What is claimed is:
1. A method, comprising:
demoting a first page of data from a first memory to a second memory;
promoting the first page of data from the second memory to an intermediate memory zone; and
promoting the first page of data from the intermediate memory zone to the first memory,
wherein:
the intermediate memory zone comprises a virtual zone within the second memory, and
the promoting of the first page of data to the first memory comprises promoting the first page of data to the first memory based on an access count of the first page of data.

2. The method of claim 1, wherein:
the first memory is faster than the second memory;
the demoting of the first page of data from the first memory to the second memory comprises a first demotion of the first page of data; and
the method further comprises:
performing a second demotion of the first page of data, the second demotion of the first page of data comprising demoting the first page of data from the first memory to the second memory; and
increasing a size of the intermediate memory zone, based on the first demotion and the second demotion.

3. The method of claim 1, further comprising:
determining that a page utilization metric in the intermediate memory zone is less than a threshold; and
decreasing a size of the intermediate memory zone.

4. The method of claim 1, further comprising:
determining that a page utilization metric in the intermediate memory zone is less than a threshold; and
decreasing a size of the intermediate memory zone,
wherein the decreasing of the size of the intermediate memory zone comprises promoting a second page of data from the intermediate memory zone to the first memory.

5. The method of claim 1, wherein the second memory is managed by a system memory manager.

6. The method of claim 1, wherein:
the second memory comprises persistent memory; and
the second memory is managed by a file system.

7. The method of claim 1, further comprising:
determining a first access count, for a second page of data, in the intermediate memory zone; and
determining a second access count, for the second page of data, in the intermediate memory zone.

8. The method of claim 7, further comprising:
determining a third access count, for a third page of data, in the intermediate memory zone;
determining that the third access count is greater than the second access count; and
based on determining that the third access count is greater than the second access count, promoting the third page of data from the intermediate memory zone to the first memory.

9. The method of claim 7, further comprising:
determining a third access count, for a third page of data, in the intermediate memory zone;
determining a fourth access count, for the third page of data, in the intermediate memory zone;
determining that a sum of the third access count and the fourth access count is greater than a sum of the first access count and the second access count; and
based on determining that a sum of the third access count and the fourth access count is greater than a sum of the first access count and the second access count, promoting the third page of data from the intermediate memory zone to the first memory.

10. The method of claim 7, further comprising:
determining a third access count, for a third page of data, in the intermediate memory zone;
determining a fourth access count, for the third page of data, in the intermediate memory zone;
determining that a number of nonzero values among the third access count and the fourth access count is greater than a number of nonzero values among the first access count and the second access count; and
based on determining that a number of nonzero values among the third access count and the fourth access count is greater than a number of nonzero values among the first access count and the second access count, promoting the third page of data from the intermediate memory zone to the first memory.

11. The method of claim 7, wherein:
the second memory comprises persistent memory;
the second memory is managed by a file system; and
the method further comprises storing the first access count, and the second access count in a file node corresponding to the second page of data.

12. A system, comprising:
a processing circuit; and
memory, operatively connected to the processing circuit and storing instructions that, when executed by the processing circuit, cause the system to perform a method, the method comprising:
demoting a first page of data from a first memory to a second memory;
promoting the first page of data from the second memory to an intermediate memory zone; and
promoting the first page of data from the intermediate memory zone to the first memory,
wherein:
the intermediate memory zone is a virtual zone within the second memory, and
the promoting of the first page of data to the first memory comprises promoting the first page of data to the first memory based on an access count of the first page of data.

13. The system of claim 12, wherein:
the first memory is faster than the second memory;
the demoting of the first page of data from the first memory to the second memory is a first demotion of the first page of data; and
the method further comprises:
performing a second demotion of the first page of data, the second demotion of the first page of data comprising demoting the first page of data from the first memory to the second memory; and
increasing a size of the intermediate memory zone, based on the first demotion and the second demotion.

14. The system of claim 12, wherein the method further comprises:
determining that a page utilization metric in the intermediate memory zone is less than a threshold; and
decreasing a size of the intermediate memory zone.

15. The system of claim 12, wherein the method further comprises:
determining that a page utilization metric in the intermediate memory zone is less than a threshold; and
decreasing a size of the intermediate memory zone,
wherein the decreasing of the size of the intermediate memory zone comprises promoting a second page of data from the intermediate memory zone to the first memory.

16. The system of claim 12, wherein the second memory is managed by a system memory manager.

17. The system of claim 12, wherein:
the second memory comprises persistent memory; and
the second memory is managed by a file system.

18. A device, comprising:
a processing circuit;
a first memory; and
a second memory,
the device being configured to:
demote a first page of data from the first memory to the second memory;
promoting the first page of data from the second memory to an intermediate memory zone; and
promote the first page of data from the intermediate memory zone to the first memory,
wherein:
the intermediate memory zone is a virtual zone within the second memory, and the promoting of the first page of data to the first memory comprises promoting the first page of data to the first memory based on an access count of the first page of data.

19. The device of claim 18, wherein the second memory is managed by a system memory manager.

20. The device of claim 18, wherein:
the second memory comprises persistent memory; and
the second memory is managed by a file system.

* * * * *